US009101112B2

(12) United States Patent
Giunta

(10) Patent No.: US 9,101,112 B2
(45) Date of Patent: Aug. 11, 2015

(54) SELF-SURVEY STAKE FOR A VIRTUAL FENCING SYSTEM

(75) Inventor: Salvatore John Giunta, Stroudsburg, PA (US)

(73) Assignee: PeTrak, LLC, Stroudsburg, PA (US)

( * ) Notice: Subject to any disclaimer, the term of this patent is extended or adjusted under 35 U.S.C. 154(b) by 950 days.

(21) Appl. No.: 12/972,839

(22) Filed: Dec. 20, 2010

(65) Prior Publication Data

US 2011/0146590 A1 Jun. 23, 2011

Related U.S. Application Data

(60) Provisional application No. 61/288,748, filed on Dec. 21, 2009.

(51) Int. Cl.
| | | |
|---|---|---|
| *A01K 15/04* | (2006.01) | |
| *A01K 15/02* | (2006.01) | |
| *G01C 15/06* | (2006.01) | |

(52) U.S. Cl.
CPC .............. *A01K 15/023* (2013.01); *G01C 15/06* (2013.01)

(58) Field of Classification Search
USPC .......... 119/721, 719, 720, 712, 908; 701/468; 340/573.1, 573.3, 573.4
See application file for complete search history.

(56) References Cited

U.S. PATENT DOCUMENTS

| | | | | |
|---|---|---|---|---|
| 5,814,968 A | * | 9/1998 | Lovegreen et al. | 320/113 |
| 5,868,100 A | * | 2/1999 | Marsh | 119/421 |
| 6,043,748 A | * | 3/2000 | Touchton et al. | 340/573.3 |
| 6,166,643 A | * | 12/2000 | Janning et al. | 340/573.3 |
| 6,232,880 B1 | * | 5/2001 | Anderson et al. | 340/573.3 |
| 6,232,916 B1 | * | 5/2001 | Grillo et al. | 342/357.4 |
| 6,441,778 B1 | * | 8/2002 | Durst et al. | 342/357.55 |
| 6,581,546 B1 | * | 6/2003 | Dalland et al. | 119/712 |
| 7,786,876 B2 | * | 8/2010 | Troxler | 340/573.4 |
| 8,113,473 B2 | * | 2/2012 | Bradley | 248/121 |
| 8,312,845 B2 | * | 11/2012 | Giunta | 119/721 |
| 8,438,999 B2 | * | 5/2013 | Hardi et al. | 119/718 |
| 2004/0108939 A1 | * | 6/2004 | Giunta | 340/572.1 |
| 2005/0000468 A1 | * | 1/2005 | Giunta | 119/721 |
| 2005/0000469 A1 | * | 1/2005 | Giunta et al. | 119/721 |
| 2005/0034683 A1 | * | 2/2005 | Giunta | 119/721 |
| 2006/0027186 A1 | * | 2/2006 | Giunta | 119/721 |
| 2006/0037559 A1 | * | 2/2006 | Belcher | 119/720 |
| 2006/0197672 A1 | * | 9/2006 | Talamas et al. | 340/573.3 |
| 2006/0202818 A1 | * | 9/2006 | Greenberg | 340/539.13 |
| 2007/0266959 A1 | * | 11/2007 | Brooks | 119/720 |
| 2011/0107981 A1 | * | 5/2011 | Giunta | 119/721 |
| 2013/0249694 A1 | * | 9/2013 | Hardi et al. | 340/573.3 |

* cited by examiner

*Primary Examiner* — Trinh Nguyen

(74) *Attorney, Agent, or Firm* — Kaplan Breyer Scwharz & Ottesen, LLP

(57) ABSTRACT

Survey stakes that include a GPS receiver as well as other electronics are used to define a boundary for a wireless fencing system. A survey stake is placed at each vertex of a containment boundary that will be used for animal confinement. The stakes survey their location by taking repetitive GPS readings and averaging them over time. The location information is transferred to an electronic collar that is to be worn by a monitored animal. That information forms the basis for the boundary definition used by the collar during monitoring operations.

20 Claims, 3 Drawing Sheets

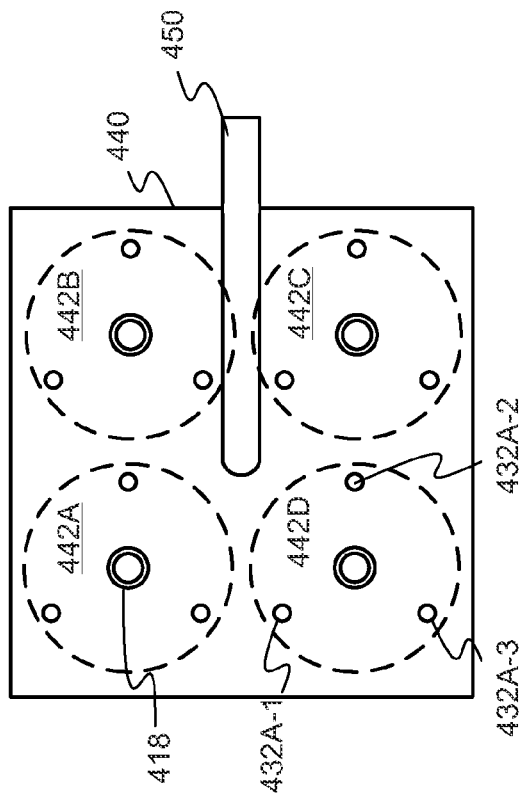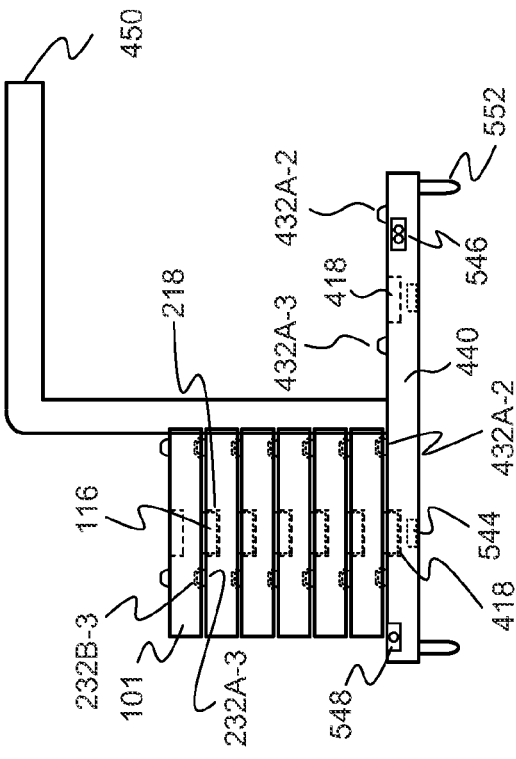

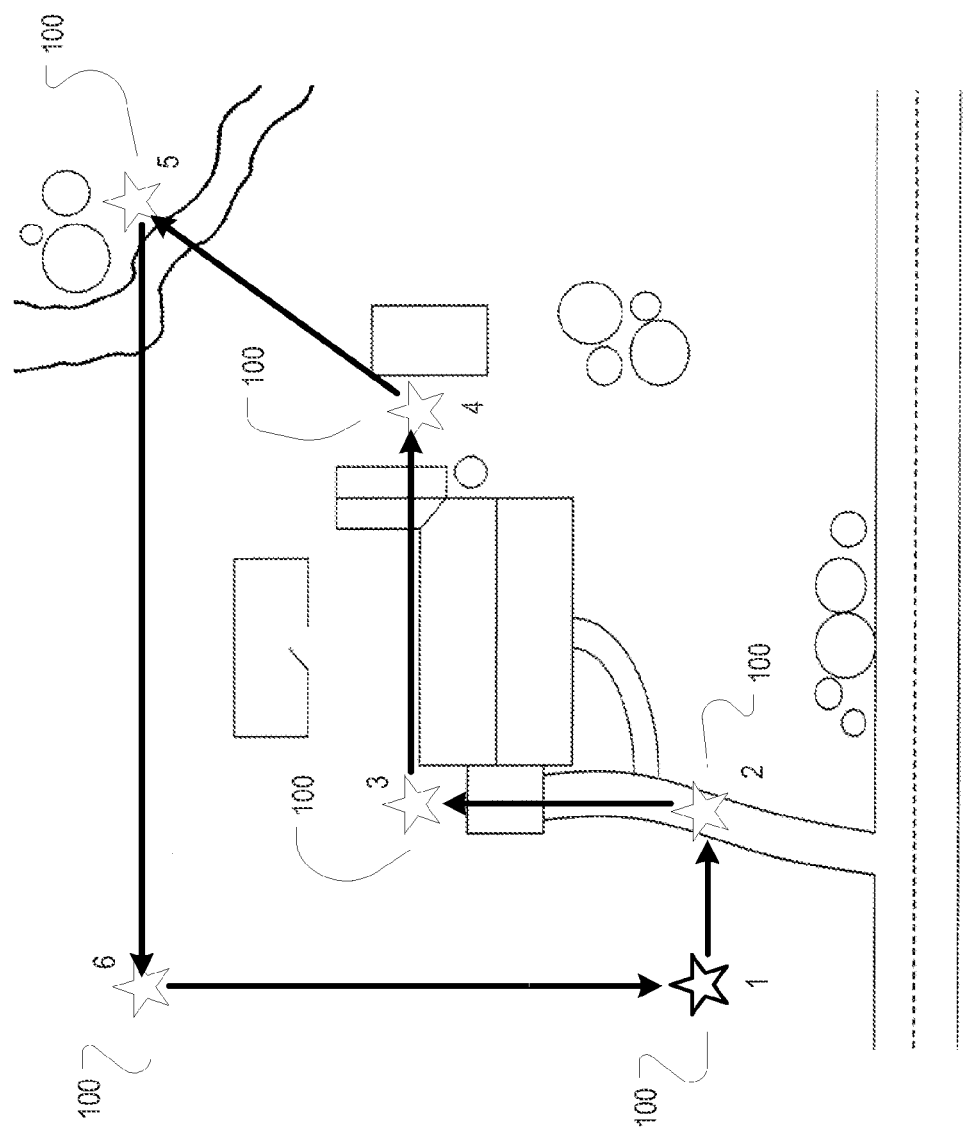

SELF-SURVEY STAKE FOR A VIRTUAL FENCING SYSTEM

CROSS REFERENCE TO RELATED APPLICATIONS

This case claims priority of U.S. Provisional Patent Application Ser. No. 61/288,748 filed Dec. 21, 2009.

FIELD OF THE INVENTION

The present invention relates to fencing systems that do not use a physical boundary for containment or exclusion of a monitored animal.

BACKGROUND OF THE INVENTION

Fencing systems that use a virtual barrier, rather than a physical barrier, to restrict the location and movement of animals are known in the art. There are two basic types of "virtual" fencing systems.

One type of virtual fencing system employs a buried wire that defines a containment boundary. The wire radiates a signal that is sensed by a device worn by a monitored animal. As the monitored animal approaches the boundary, the signal is sensed and the device delivers a correction (e.g., typically sound or an electric shock) to the animal to dissuade it from breaching the boundary.

The other type of virtual fencing system uses a wireless positioning system, such as GPS, to establish a boundary and determine an animal's location. In this type of system, a control unit that includes a GPS positioning receiver, a means for applying a correction, and suitable control and logic circuitry/software is typically attached to an animal's collar. In conjunction with the control unit, a user establishes a containment boundary. The boundary is defined by positional coordinates, which are obtained from the GPS positioning receiver. In use (after the boundary is defined), the control unit compares the position of the receiver (i.e., the position of a monitored animal) with the containment boundary. In some such systems, as the animal approaches a warning zone near the boundary, a warning (i.e., a sound) is delivered. If the animal continues toward the boundary, a stimulus (i.e., low-level shock) is typically administered to the animal.

One benefit of some wireless fencing systems, relative to buried-wire systems, is that the wireless fencing system has the ability to dynamically change the boundary in order to regain control of an animal after a breach. Once breach occurs in a buried-wire system, the ability to control the animal is lost. A second benefit of some wireless fencing systems over a buried-wire system is that there is no disincentive in a wireless fencing system to re-cross a breached boundary. In particular, if an animal attempts to return to the original containment zone in a buried-wire system, it will be corrected (i.e., receive a stimulus) as it nears the wire. This provides a disincentive to return to the containment zone. In contrast, in a wireless system, the boundary can be reestablished behind a returning animal so that he will not be corrected or otherwise dissuaded from returning to the original confinement zone.

There are, however, some problems and drawbacks to wireless fencing systems. One problem is that there is some range of error associated with GPS positional data. For the low-cost receivers used in consumer electronic products this error, expressed as CEP or Circular Error Probability, is typically about 2 to 3 meters. Since the same receiver, or same type of receiver, will be used to program the boundary, this error will occur in both the control unit during normal containment operations and in the embedded boundary data set that defines the containment zone. Because these errors are unpredictable and non-correlated, they will sum in unpredictable magnitude and direction. That is, whatever errors occurred when the boundary is being programming will sum with the errors whenever the GPS receiver on the monitored animal is determining its current location.

Due the fact that the errors are all in random directions away from the true (geodesic) location, the relative position of the boundary and the pet may actually appear to increase or decrease in magnitude and shift in direction each time the position is calculated from new GPS data. Many solutions have been proposed to this problem, but they are generally prohibitive in cost or complexity, while yielding only marginal improvements.

A need exists, therefore, for a wireless fencing system that avoids or at least mitigates the potentially significant positional errors associated with the prior art.

SUMMARY OF THE INVENTION

The present invention provides a virtual fencing system that has improved positional accuracy compared to the prior art.

Embodiments of the present invention utilize a rechargeable, battery-powered collar unit that is worn by an animal that is to be contained by the virtual fencing system. The collar unit will first audibly warn and then, if necessary, apply a low level electric shock, in accordance with its programming, to deter an animal from crossing a virtual boundary. The design and programming of the collar, as well as various methods for determining when to provide sound/stimulus to a monitored animal are not germane to the present invention and, as a consequence, will not be discussed herein. Such information is available in co-pending Published U.S. Pat. Applications 2005/0000468, 2005/0000469, 2005/0634683, and 2006/0027186, all of which are incorporated by reference herein.

Set-up of a virtual fencing system requires boundary definition. In the prior art, boundary definition involves first placing flags at the vertices of a typically polygonal boundary and periodically along every side of the boundary. The purpose of the flags is two-fold. One, they are used to help the virtually-fenced animal learn the location of the containment boundary. Two, the flags are used during GPS-based boundary definition, wherein a user walks the flag-defined boundary and obtains periodic GPS readings using a GPS receiver, such as is contained in an electronic collar.

In accordance with the illustrative embodiment of the present invention, rather than placing a conventional flag at each vertex, a "survey stake" is placed there instead. Each survey stake includes a GPS receiver as well as other electronics, as described further below. Once placed and activated, the stakes will begin to self survey their location by taking repetitive GPS readings and averaging them over time. This averaging technique is well known to those skilled in the art to null out various sources of error, including multipath. After a period of time (e.g., 24 to 48 hours, etc.), the survey stakes are collected and the positional data is harvested from each stake. This positional data is the basis for defining the boundary and will be substantially free of geodetic error eliminating the typical 2-3 meter variance and allowing the creation of a precise boundary data set. In some embodiments, the harvesting operation comprises placing the survey stakes in a transport fixture. The collar unit is then placed into a programming fixture (described in the referenced Published Patent Applications) and brought into proximity of the transport fixture. A programming switch on the programming fixture is then activated. This causes the collar unit to poll the survey stakes and collect their positional data.

BRIEF DESCRIPTION OF THE DRAWINGS

FIG. 4 depicts a top view of a transport/charge fixture for use in conjunction with the illustrative embodiment of the present invention.

FIG. 5 depicts electronics modules stacked on the transport/charge fixture.

FIG. 6 depicts survey stakes positioned at the vertices of a confinement boundary.

DETAILED DESCRIPTION

Figure 1:
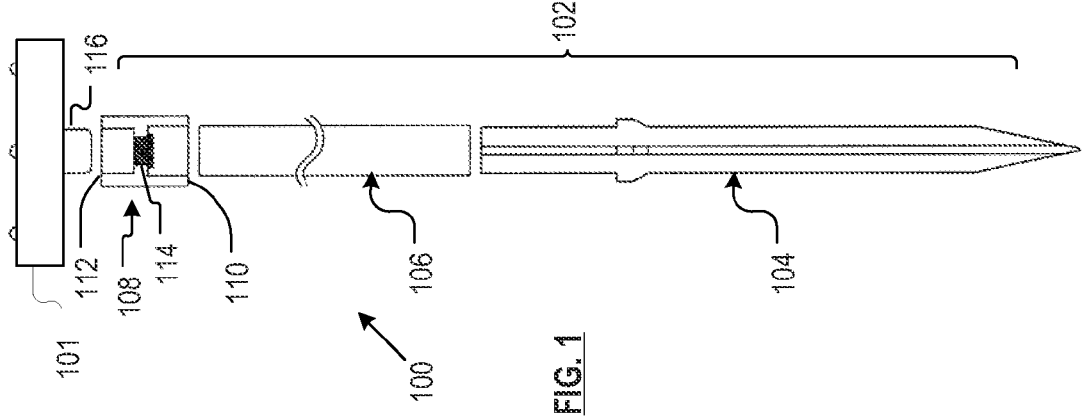
FIG. 1 depicts a survey stake in accordance with the illustrative embodiment of the present invention.

Structure of a Survey Stake. Referring now to FIG. 1, in the illustrative embodiment, each survey stake 100 comprises (1) electronics module 101 and (2) support assembly 102.

Support assembly 102 serves to stably lift/elevate electronics module 101. The purpose for elevating the electronics module is so that the location-determining electronics (e.g., GPS receiver, etc.) therein can obtain a good positional reading for boundary definition. Support assembly 102 addresses the not-unlikely situation in which a desired containment boundary requires positioning a survey stake in a stream, or in very dense underbrush, or in a location that has an obscured view of the sky. In these and other scenarios, it will be necessary to elevate electronics module 101 to keep it out of the stream, elevate it above the underbrush, or raise it so that it clears the features that obstruct a clear view of the sky. Even at locations having an unrestricted view of the sky, multipath tends to be worse near ground level, such that elevating electronics module 101 is advantageous if not advisable for obtaining best positional accuracy.

In the illustrative embodiment, support assembly 102 includes a metal or plastic ground penetrator 104, shaft 106, and cap 108.

Cap 108 is dimensioned and arranged to receive, at end 112, protrusion 116 on the lower surface of electronics module 101. In the illustrative embodiment, cap 108 includes magnet 114 to increase the retention force between electronics module 101 and the cap. To this end, electronics module also includes a magnet (see, FIG. 2, magnet 236). Other approaches for securing the electronics module to the cap can suitably be used (e.g., press-fit, threaded engagement, hook-and-loop fastener, pins, etc.) The cap is further dimensioned and arranged to receive, at end 110, shaft 106. In some embodiments, cap 108 is a molded plastic part.

Shaft 106 functions to physically couple electronics module 101 to ground penetrator 104, which, as depicted in FIG. 1, couples to "lower" end of shaft 106. The shaft also provides, as necessary, the height required to clear obstacles and is, therefore, available in a variety of different lengths. In the illustrative embodiment, shaft 106 comprises electrical metallic tubing ("EMT"). A flag (not depicted) is optionally attached to shaft 106.

Ground penetrator 104 is, as its name implies, suitable for penetrating soil to anchor survey stake 100 for boundary definition. Although suitable for use in relatively soft soil, ground penetrator 104 is not suitable for stably supporting the electronics module in relatively impenetrable ground, such as rocky terrain or pavement. As a consequence, in some alternative embodiments, a tripod or other fixture that, while providing minimal or no ground penetration, is used rather than the ground penetrator to stably support and elevate electronics module 101.

Thus, support assembly 102 provides stability, height, and coupling functionalities. In the illustrative embodiment, these functionalities are provided by three elements: ground penetrator 104, shaft 106, and cap 108. In some other embodiments, the functionality of ground penetrator 104 and shaft 106 can be combined using a ground penetrator having an extendable length (e.g., a telescoping construction, etc.) or simply using a ground penetrator having the length required to clear a given obstacle. As previously disclosed, in some scenarios, ground penetrator 104 is not suitable for anchoring the stake. Therefore, in some embodiments, support assembly 102 comprises a tripod or other article suitable for providing stability for survey stake 100. In such embodiments, one or both of tubular shaft 106 and cap 108 is not used, or is appropriately modified. That is, in some embodiments, the required height is provided by the tripod. And, in some embodiments, the tripod can be modified to directly accept electronics module 101 without the need for cap 108.

It is notable that the term "stake" in the moniker "survey stake" is not intended to be limiting. That is, as disclosed above, survey stake 100 might not, in all embodiments, include stake-like features, such as ground penetrator 104. Nevertheless, the term is used herein and in the appended claims to refer to any and all physical arrangements of anchoring/elevating/supporting elements that are used in conjunction with electronics module 101.

Figure 2:
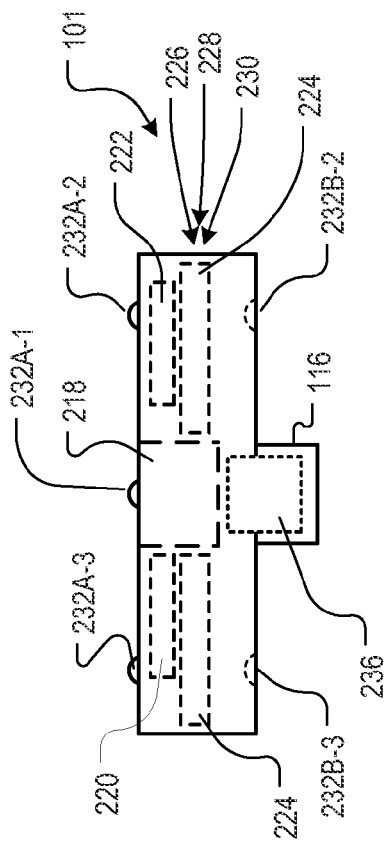
FIG. 2 depicts further detail of the electronics module of the survey stake of FIG. 1.

Referring now to FIG. 2, electronics module 101 comprises internal electronics, such as rechargeable battery 220, GPS antenna 222, and printed circuit board ("PCB") 224. The PCB further includes electronics such as GPS receiver 226, ZigBee transceiver/antenna 228, microprocessor 230 as well as battery-charger circuitry and other peripheral circuitry.

The GPS receiver 226 and GPS antenna 222 are used for location determination in known fashion. GPS antenna 222 can be implemented as a patch antenna, well known to those skilled in the art. In some embodiments, an external GPS antenna (not depicted) is used. ZigBee transceiver/antenna 228 is used for communications with the collar or for inter-module communications, such as for embodiments in which survey stakes 100 are configured as a mesh network. In some embodiments, an external Zigbee antenna (not depicted) is used. Microprocessor 230 controls circuitry in electronics module 101.

Battery 220, which in some embodiments is a lithium-ion battery, powers GPS antenna 222, GPS receiver 226, ZigBee transceiver/antenna 228, microprocessor 230, etc.

Electronics module 101 also includes various external electrical contacts. In particular, in the illustrative embodiment, the electronics module includes three electrical contacts 232A-1, 232A-2, and 232A-3 (generically referenced as contacts "232A-i") on its upper surface and three electrical contacts 232B-1, 232B-2, and 232B-3 (generically referenced as contacts "232B-i") on its lower surface. In the illustrative embodiment, contacts 232A-i are electrically conductive "bumps" and contacts 232B-i are electrically conductive recesses/depressions. Only two of the lower-surface electrical contacts are visible in FIG. 2.

In some embodiments, one of the upper-surface contacts (e.g., 232A-1, etc.) and one of the lower-surface contacts (e.g., 232B-1, etc.) is a ground or low side power common, another of the upper-surface contacts (e.g., 232A-2, etc.) and lower-surface contacts (e.g., 232B-2, etc.) is used for recharging, and the third contact on both the upper surface (e.g., 232A-3, etc.) and lower surface (e.g., 232B-3, etc.) is for group activation and deactivation control.

Contacts 232A-i on the upper surface and contacts 232B-i on the lower surface are appropriately dimensioned and located to electrically communicate with one another, such as when a first electronics module 101 is placed on top of a second electronics module 101. This enables various operations (e.g., charging, etc.) to be conducted to plural electronics modules 101 at the same time by stacking them, as discussed further later in this specification in conjunction with FIGS. 4 and 5.

With regard to stacking, electronics module 101 includes a keying feature to ensure proper rotational alignment thereof. All electronics modules 101 in a stack must exhibit the same rotational alignment so that each electrical contact 232A-i on the upper surface of each electronics module 101 in the stack couples to the correct electrical contacts 232B-i on the lower surface of each electronics module 101 (e.g., "ground" to "ground," etc.). For example, in some embodiments, each electronics module 101 includes a ridge (not depicted) on its lower surface and a groove (not depicted) in its upper surface. The ridge and groove are dimensioned and arranged so that they will mate when the upper surface of a first electronics module 101 is brought into abutment with the lower surface of a second electronics module 101 as long as the modules have the same rotational alignment. In some embodiments, the ridge is disposed on protrusion 116 and the groove is in receiving region 218.

With continuing reference to FIG. 2, electronics module 101 further comprises receiving region 218, magnet 236, and previously-referenced protrusion 116. Receiving region 218 and protrusion 116 are suitably dimensioned and located to facilitate stacking plural electronics modules 101. That is, in a stack of electronics modules 101, receiving region 218 of a first electronics module receives protrusion 116 of the electronics module that is stacked on top of it. Magnet 236 increases the retention force between electronics modules when they are stacked.

Figure 3:
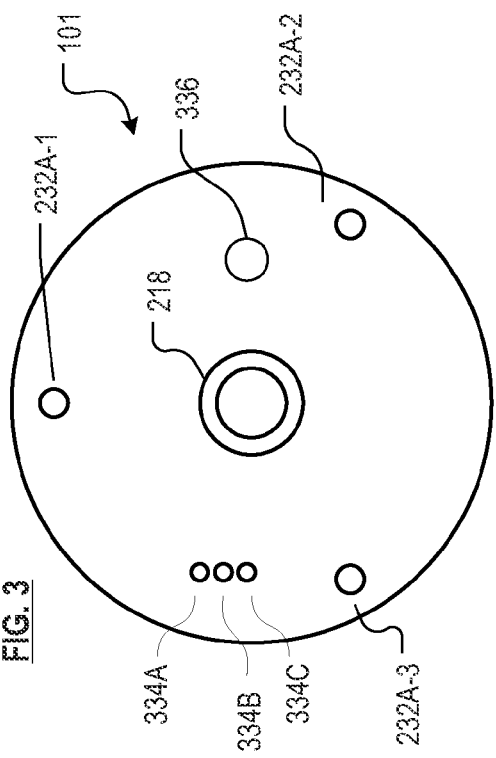
FIG. 3 depicts a top view of the electronics module depicted in FIG. 2.

Referring now to FIG. 3, electronics module 101 also includes, in the illustrative embodiment, three LEDs 334A, 334B, and 334C, and surface marking 336. The LEDs provide information about the mode/functioning/status of electronics module 101 and the system: one LED provides for GPS status, a second LED for Zigbee status, and a third LED for the status of the Survey operation. Further details about the operational modes, etc., and LED status indications are provided in Table 1 below. Surface marking 336, which in the illustrative embodiment is simply a "dot" (i.e., a solid circle of a given color), is used as a visual target when using an external device, such as a key fob, to change the mode of electronics module 101. In preferred embodiments, a key fob or other external device is used to toggle the modes/operation of the electronics module. In some other embodiments, electronics module 101 includes an exposed switch for toggling mode/operation.

Transport/Charge Fixture. FIGS. 4 and 5 depict fixture 440, which is used to transport and charge electronics module 101 of each survey stake 100. In the illustrative embodiment, fixture 440 accommodates a plurality of electronics modules 101 arranged into four stacks. One such stack is depicted in FIG. 5; the broken "circles" appearing in FIG. 4 demarcate the perimeter of the four stacks of electronics modules, indicating the placement thereof on fixture 440.

To accommodate the plural stacks of electronics modules 101, the upper surface of fixture 440 comprises four groupings 442i, wherein i=A, B, C, D, of three electrical contacts 432A-1, 432A-2, and 432A-3 (collectively "432A-i"). These electrical contacts are directly analogous to the three contacts 232A-i on the upper surface of each electronics module 101. Contacts 432A-i are dimensioned and arranged to mate with electronics contacts 232B-i on the lower surface of each electronics module.

Receiving recess 418 disposed on the upper surface of fixture 440 at the center of each grouping 442i as well as magnet 544 disposed beneath each receiving recess aid in holding/stabilizing electronics modules 101 on fixture 440. Proper rotational alignment of contacts 432A-i on the surface of fixture 440 with contacts 232B-i on the lower surface of a first electronics module 101 to be stacked at each of the four locations is provided, at each such location, by an appropriate keying feature (not depicted). The keying feature is consistent with the keying features, previously discussed, that are used on individual electronics modules 101.

Fixture 440 includes jack 546 for connection to a charger to re/charge electronics modules 101 (through contacts 432i). The fixture also includes activation switch 548, the purpose of which is discussed further below. For convenience, fixture 440 incorporates handle 450. Legs 552 are provided on the bottom surface of the fixture.

Operation and Use of Survey Stakes. Electronics module 101 is placed in a low power mode when manufactured and becomes operational upon initial charging. Electronics modules 101 are taken to the site of an intended installation via transport/charge fixture 440. Once on site, activation switch 548 on transport/charge fixture 440 is actuated. This activates all electronics modules 101 via an appropriate one (i=1, 2, or 3) of contacts 432A-i/232A-i/232B-i.

Upon detecting an activation signal through the appropriate electrical contact, each electronics module 101 enters a "set-up" mode. In set-up mode, each electronics module 101 activates its ZigBee radios and GPS receivers and begins to collect updated GPS almanac and ephemeris data. Each electronics module 101 adopts an initial sequence number of "1." The transport/charge fixture must be in view of the sky during this time and while the units are placed around the boundary. The particular LED 334A, 334B, or 334C that provides GPS signal strength for each electronics module 101 will be "blinking" green until the GPS receiver therein is in a good navigation state (e.g., acquires at least three satellites, etc.) at which point the LED will be "steady" green. The "blinking" and "steady" indications are useful when a single LED color is used for indication. If two colors are used, "red" can substitute for "blinking" green and "green" can substitute for "steady" green, etc.

The boundary is initially (physically) defined using support assembly 102 from plural survey stakes 100. Assuming that the boundary is polygonal, a support assembly must be placed at all vertices of the boundary. Non polygonal-shaped boundaries will generally require more markers for adequate demarcation. In a "mesh-network" mode of operation, which is described further below, survey stakes might be required (for use as network repeaters—not for additional positional readings) at intermittent locations along each boundary segment.

Once all electronics modules 101 have been set-up as described above, and assuming that the GPS LED of each module displays "steady" green, they are ready for placement on support assemblies 102 at each vertex of the boundary.

The installer then walks the boundary, placing an electronics module 101 on each support assembly 102. This operation begins at any arbitrary start point and proceeds sequentially to the final vertex, as indicated in FIG. 6. As each electronics module 101 is placed on a respective support assembly 102, it is placed in a "survey" mode. In the illustrative embodiment, this is accomplished using a magnetic key fob. The key fob assigns the current sequence to the particular survey stake 100 stake, which represents its placement order. The first module will be assigned the number "1."

As part of this process, the assigned number is transmitted to the other electronic modules 101 remaining in transport/charge fixture 440. The remaining modules 101 will adopt a sequence number of "2." After this transmission, the ZigBee radio within the sited electronic module 101 is automatically deactivated. In the survey mode, the GPS receiver in the sited module will survey its location by taking repetitive GPS readings and averaging them over a relatively extended period of time (e.g., hours) rather than seconds. This is a well-known technique to null out various sources of error, including multipath. As each subsequent electronics module 101 is placed, it announces its sequence number and each remaining unit increments its number by one.

Survey stakes 100 will continue to collect GPS data and to average that data according to any of a variety of algorithms. Assuming that the battery can provide at least 24 hours worth of readings, an installer can choose a convenient period of time over which electronics modules 101 acquires GPS readings; that is, for 4 hours, for 8 hrs, for 12 hrs, for 16 hrs, for 24 hours, etc. Of course, the averaging period will affect accuracy: 4 to 6 hrs resolves position to about 1 meter, 12 hours resolves position to a few tenths of a meter, and 24 hours of surveying resolves position to within about a tenth of a meter. Once the surveying period is over, survey stakes 100 cease collecting GPS data and electronics modules 101 are retrieved and returned to transport/charge fixture 440. Before returning each electronics module 101 to the transport fixture, the key fob, etc., is used to switch them from "survey" mode to "download" mode.

The period of time over which the survey stakes can collect GPS data is ultimately limited, in the illustrative embodiment, by the available power, as provided by battery 220 within each electronics module. To that end, as a protective default, electronics modules 101 will cease collecting/averaging data when battery power falls to a predetermined level (e.g., 5% remaining battery power, e.g.) regardless of the scheduled length of the data-collection period. This insures that the data collected by the electronics modules is protected and retrievable. Upon retrieval of each electronics module, the key fob is used to switch them from survey mode to download mode prior to returning them to the transport fixture.

The collar, which will eventually be worn by a monitored animal, is placed into the programming fixture. The collar and programming fixture are brought into proximity with transport/charge fixture 440. A "programming" switch on the programming fixture is then activated. Activating the switch causes the collar to interrogate all electronics modules 101 and download the geodetic data and associated sequence numbers. Using the data and sequence numbers, the processor in the collar creates a boundary map and stores it in memory. This completes the programming of the collar.

Once electronics modules 101 have downloaded their data, in some embodiments, they are placed in a lower power condition by a deactivation signal that is delivered through the appropriate electrical contact. In this condition, they keep the geodetic data in memory as a backup until they are once again placed in set-up mode in transport/charge fixture 440.

Table 1 provides a summary of the operation of survey stakes.

TABLE 1

Operational Mode Summary for Self-Survey Stakes

| MODE | MODE ENTRY | MODE FUNCTIONS | LED MODE INDICATIONS |
|---|---|---|---|
| Off | Survey units (i.e., elec module 101) are placed in a transport/charge ("T/C") fixture and stacked on top of each other. This connects two charging contacts and grounds a third contact that disables the internal power supply circuit. | None: GPS "off" Zigbee "off" Processor "off" | No indication on the survey units. |
| Charge | Survey units are stacked in the T/C fixture. A charger is plugged into the base of the T/C fixture and is then plugged into power. | The battery in each survey unit is charging, but all else is "off." Each unit includes internal smart charger circuit to prevent overcharging. | No indication on the survey units. |
| Set-Up | Activation switch on the T/C fixture transitions from "off" to "on," which enables the power supply in each survey unit. | Acquire GPS track prior to putting units on a stable lift at the boundary locations. Listen for incremental boundary-position messages from other survey units. GPS "on" Zigbee "on" | GPS: blinking green in acquisition mode; solid green in good nav state. Zigbee: generally "on"; blinking when transmitting. Survey: "off" |
| Survey | With survey units placed at the boundary location, momentarily place key fob over a survey unit to enter "Survey" mode. | Perform "long-term" position average of the GPS position. GPS "on" Zigbee "off" | GPS: Solid green in good nav state. Zigbee: "off" Survey slow blink |

TABLE 1-continued

Operational Mode Summary for Self-Survey Stakes

| MODE | MODE ENTRY | MODE FUNCTIONS | LED MODE INDICATIONS |
|---|---|---|---|
| Download | When survey done, momentarily place key fob over a survey unit. This will toggle the mode from "Survey" to "Download." | Download surveyed position to the collar on Zigbee command. GPS "off" Zigbee "on" | GPS: "off" Zigbee: generally "on; " blinking when transmitting Survey: "off" |

In some embodiments, the ZigBee transceivers 228 are preprogrammed to operate in mesh network mode. This enables the data to be collected while in proximity of any one node (i.e., electronics module 101), as opposed to first stacking all electronics modules on transport/charge fixture 440. A disadvantage of this approach is that each of the nodes must be able to reach at least two other nodes, the previous one and the next along the boundary, for the network to communicate successfully. To this end, each electronics module 101 includes a ZigBee signal strength indicator (i.e., one of LEDs 334A, 334B, or 334C). If a module fails to display sufficient RF signal strength, the installer walks back towards the prior survey stake until the signal strength is sufficient, at which point the survey stake is placed and the process continued. Any survey stakes 100 that are placed along a boundary segment, instead of at a vertex, are simply included in the boundary data set and are primarily used as network repeaters to facilitate communication across the entire network.

As previously discussed, survey stakes 100 will then begin to survey their location by taking repetitive GPS readings and averaging them over time. After a period of time, the collar is placed into the programming fixture and brought into proximity of any of the boundary stakes, at which time the programming switch is activated. The collar then polls the nearest node (i.e., survey stake) and collects the positional data through it for each of the stakes in the network. That data is the basis for the boundary program within the collar and will be substantially free of geodetic error.

In some embodiments, as desired, a computer is used to alter the boundary, such as by adding/deleting points, dragging points to other positions, etc. In such embodiments, the "original" boundary is "downloaded" from the collar or from the survey stakes to the computer. After alterations are made, the "revised" boundary is uploaded to the collar via ZigBee.

In some alternative embodiments, rather than using a plurality of electronics modules 101 to acquire and average GPS data for boundary definition, the collar itself can be used for that purpose. In such embodiments, the collar and support assembly 102 (appropriately modified to receive the collar) compose an alternative embodiment of survey stake 100.

In one such an embodiment, support assemblies 102 are placed at each vertex of the proposed containment boundary. The collar is placed on the support assembly at a first one of the vertices and collects GPS data for a period of about four to six hours. The collar is then moved to the support assembly at the next vertex to collect GPS data for the same period of time. This process is repeated, vertex by vertex, until the collar has been placed on each support assembly at each vertex to collect the GPS data needed to provide a complete boundary definition. In another of such embodiments, the collar is used in conjunction with only a single support assembly 102. This single survey stake is moved sequentially from vertex to vertex. Again, the collar spends about four to six hours collecting data at each vertex.

These alternative embodiments will provide a somewhat lower level of boundary precision than the illustrative embodiment (assuming that the collar spends less time at each vertex than plural electronics modules 101). But in applications in which the property and containment boundary are very large, it is expected that a relatively lower level of boundary precision will be required. In any case, these embodiments will provide improved boundary precision relative to the prior art.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A system comprising a plurality of survey stakes, wherein each survey stake comprises:
    an electronics module including a GPS receiver, wherein the electronics module surveys its own location by taking repetitive GPS readings and averages the readings over a period of time; and
    a support assembly, wherein the support assembly receives the electronics module and is physically adapted to elevate the electronics module to a height suitable for avoiding obstructing features that would otherwise attenuate signals that the electronics module uses to perform at least one of the following tasks:
    (a) determine location; or
    (b) communicate with other electronics modules.

2. The system of claim 1 wherein the support assembly comprises:
    a ground penetrator for penetrating ground;
    a shaft that couples to the ground penetrator, wherein the shaft raises the electronics module to the suitable height; and
    a cap that couples to the shaft, wherein the shaft is configured to receive the electronics module.

3. The system of claim 2 and further wherein a flag is attached to the shaft.

4. The system of claim 2 wherein the electronics module comprises a magnet and the cap comprises a magnet.

5. The system of claim 1 wherein the electronics module comprises:
    a rechargeable battery for powering the GPS receiver;
    a GPS antenna; and
    a microprocessor, wherein the microprocessor controls the operation of the GPS receiver and charging operations for the rechargeable battery.

6. The system of claim 5 wherein the electronics module further comprises an external contact by which the rechargeable battery is charged.

7. The system of claim 1 wherein the electronics module further comprises an external contact that serves as a ground or low side power common.

8. The system of claim 1 wherein the electronics module further comprises an external contact that is used to activate or deactivate the electronics module.

9. The system of claim 1 wherein the electronics module comprises a housing that includes physical adaptations to enable the electronics module to be stacked.

10. The system of claim 1 wherein the electronics module further comprises a display, wherein the display provides an indication of a mode of the electronics module and information pertaining to the GPS receiver.

11. The system of claim 10 wherein the display comprises at least one LED.

12. The system of claim 1 wherein the electronics module further comprises a ZigBee transceiver.

13. The system of claim 1 and further wherein when suitably interrogated, each survey stake provides location information obtained thereby.

14. The system of claim 1 further comprising a fixture upon which a plurality of the electronics modules can be stacked and electrically charged.

15. The system of claim 1 further comprising a fixture upon which a plurality of the electronics modules can be stacked and set-up, wherein set-up comprises activation of the GPS receiver in each electronics module and the collection, by each GPS receiver, of updated GPS almanac and ephemeris data.

16. A system comprising a plurality of survey stakes, wherein each survey stake comprises:
   an electronics module including a GPS receiver, wherein the electronics module surveys its own location by taking repetitive GPS readings and averages the readings over a period of time; and
   a support assembly, wherein the support assembly securely receives the electronics module and is physically adapted to:
   (i) elevate the electronics module to a height suitable for avoiding obstructing features that would otherwise attenuate signals that the electronics module uses to perform at least one of the following tasks:
      (a) determine location during boundary-definition operations; or
      (b) communicate with other electronics modules during boundary-definition operations; and
   (ii) stably and securely immobilize itself so that the electronics module remains immobile, thereby ensuring that the electronics module does not change position during the repetitive GPS readings.

17. The system of claim 16 wherein the support assembly comprises:
   a ground penetrator for penetrating ground;
   a shaft that couples to the ground penetrator, wherein the shaft raises the electronics module to the suitable height; and
   a cap that couples to the shaft, wherein the shaft is configured to receive the electronics module.

18. The system of claim 17 further comprising a fixture upon which a plurality of the electronics modules can be stacked and set-up, wherein set-up comprises activation of the GPS receiver in each electronics module and the collection, by each GPS receiver, of updated GPS almanac and ephemeris data.

19. A survey stake comprising:
   an electronics module including a GPS receiver, wherein the electronics module surveys its own location by taking repetitive GPS readings and averages the readings over a period of time; and
   a support assembly, wherein the support assembly securely receives the electronics module and is physically adapted to:
   (i) elevate the electronics module to a height suitable for avoiding obstructing features that would otherwise attenuate signals that the electronics module uses to determine location during boundary-definition operations; and
   (ii) stably and securely immobilize itself, thereby ensuring that the electronics module does not change location during the repetitive GPS readings.

20. The survey stake of claim 19 wherein the support assembly comprises:
   a ground penetrator for penetrating ground;
   a shaft that couples to the ground penetrator, wherein the shaft raises the electronics module to the suitable height; and
   a cap that couples to the shaft, wherein the shaft is configured to receive the electronics module.

* * * * *